US 8,217,100 B2

United States Patent
Ogawa et al.

(10) Patent No.: US 8,217,100 B2
(45) Date of Patent: Jul. 10, 2012

(54) ADHESIVE COMPOSITION AND OPTICAL MEMBER

(75) Inventors: Hiroshi Ogawa, Kanagawa (JP);
Tatsuhiro Suwa, Kanagawa (JP);
Cheong Hun Song, Seoul (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 902 days.

(21) Appl. No.: 12/216,980

(22) Filed: Jul. 14, 2008

(65) Prior Publication Data
US 2009/0014123 A1  Jan. 15, 2009

(30) Foreign Application Priority Data
Jul. 13, 2007  (JP) ................................. 2007-184400

(51) Int. Cl.
C08K 5/3415 (2006.01)
C08K 5/5455 (2006.01)
C08K 5/3472 (2006.01)
C08K 5/16 (2006.01)

(52) U.S. Cl. .......... 524/104; 524/556; 524/106; 524/99; 524/115; 524/186; 156/327

(58) Field of Classification Search .................. 524/104, 524/106, 99, 556, 115, 186; 156/327
See application file for complete search history.

(56) References Cited

U.S. PATENT DOCUMENTS

| 5,717,015 A * | 2/1998 | Dust et al. ...................... 524/236 |
| 6,372,829 B1 * | 4/2002 | Lamanna et al. ................ 524/99 |
| 6,562,428 B1 | 5/2003 | Ohrui |
| 6,939,911 B2 * | 9/2005 | Tosaki et al. ................... 524/522 |
| 7,658,992 B2 * | 2/2010 | Satake et al. .................. 428/341 |
| 7,750,075 B2 * | 7/2010 | Kim et al. ...................... 524/560 |
| 2005/0197450 A1 | 9/2005 | Amano |
| 2009/0053519 A1 * | 2/2009 | Ogawa et al. ........... 428/355 AC |
| 2010/0239859 A1 * | 9/2010 | Song et al. ............. 428/355 CN |

FOREIGN PATENT DOCUMENTS

| JP | 2000-273417 A | 10/2000 |
| JP | 2006-011365 A | 1/2006 |
| WO | WO 2005114270 A1 * | 12/2005 |
| WO | WO 2007149748 A1 * | 12/2007 |

OTHER PUBLICATIONS http://msds.chem.ox.ac.uk/TE/tetrabutylammonium_perchlorate.html, May 27, 2008.*
http://www.chemyq.com/En/xz/xz12/113563yunel.htm, Jan. 4, 2008.*
http://www.chemblink.com/products/554-68-7.htm, Oct. 20, 2007.*
http://www.sigmaaldrich.com/img/assets/3900/Thermal_Transitions_of_Homopolymers.pdf, May 14, 2003.*

* cited by examiner

*Primary Examiner* — Satya Sastri
(74) *Attorney, Agent, or Firm* — Lee & Morse, P.C.

(57) ABSTRACT

An adhesive composition includes an antistatic agent that includes an ionic compound having a melting point of 50° C. or more, and a base polymer having a glass transition temperature of 0° C. or less.

24 Claims, 5 Drawing Sheets

TABLE 1A

| Constitutional ratio of adhesive composition | | EXAMPLE | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Base polymer (%) | BA | 98.99 | 97.9 | 87.2 | 98.5 | 98.95 | 99.1 | 94.2 | 92.1 | 88.2 | 92.3 | 95.2 |
| | 2EHA | - | - | 10 | - | 5 | - | 3 | 4 | 9 | 5 | 2 |
| | HEA | 1 | - | - | 1 | - | - | 2 | - | 1 | - | 1 |
| | 4HBA | - | 2 | - | - | - | - | - | 2 | - | 1 | - |
| | AA | - | - | 1 | - | 1 | 0.8 | - | 0.7 | 0.8 | 0.7 | 0.8 |
| Ionic compound (%) | Compound 1 | 0.01 | - | - | - | 0.05 | 0.1 | 0.8 | 1.2 | - | - | - |
| | Compound 2 | - | 0.1 | - | - | - | - | - | - | 1 | - | - |
| | Compound 3 | - | - | 1.8 | - | - | - | - | - | - | 1 | - |
| | Compound 4 | - | - | - | 0.5 | - | - | - | - | - | - | 1 |
| Sum (%) | | 100 | 100 | 100 | 100 | 100 | 100 | 100 | 100 | 100 | 100 | 100 |

BA: butyl acrylate
2EHA: 2-ethylhexylacrylate
HEA: 2-hydroxyethylacrylate
4HBA: 4-hydroxybutylacrylate
AA: acrylic acid
Compound 1: 1-ethylpyridinium bromide (made by Tokyo Casei Industries Ltd., m.p. 120°C)
Compound 2: tetra-n-butylammonium hexafluorophosphate (made by Tokyo Casei Industries Ltd., m.p. 246°C)
Compound 3: n-hexadecyltrimethylammonium hexafluorophosphate (made of Tokyo Casei Industries Ltd., m.p. 185°C)
Compound 4: cyclohexyltrimethylammonium bis(trifluoromethanesulfonyl)imide (made by Tokyo Casei Industries Ltd., m.p. above 50°C)

TABLE 1B

| | EXAMPLE | | | | | | | | | | |
|---|---|---|---|---|---|---|---|---|---|---|---|
| | 1 | 2 | 3 | 4 | 5 | 6 | 7 | 8 | 9 | 10 | 11 |
| Viscosity (mPa·s) | 4000 | 5000 | 3500 | 3500 | 4000 | 5000 | 4000 | 4000 | 3500 | 4000 | 4000 |
| Concentration (%) | 20 | 20 | 20 | 20 | 20 | 20 | 20 | 20 | 20 | 20 | 20 |
| Tg of base polymer (°C) | -52 | -53 | -53 | -52 | -52 | -51 | -52 | -53 | -53 | -53 | -51 |
| Weight average molecular weight of base polymer | 1,600,000 | 1,800,000 | 1,300,000 | 1,400,000 | 1,400,000 | 1,700,000 | 1,600,000 | 1,500,000 | 1,300,000 | 1,500,000 | 1,500,000 |

FIG. 1A

TABLE 1A

| Constitutional ratio of adhesive composition | | EXAMPLE | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Base polymer (%) | BA | 98.99 | 97.9 | 87.2 | 98.5 | 98.95 | 99.1 | 94.2 | 92.1 | 88.2 | 92.3 | 95.2 |
| | 2EHA | - | - | 10 | - | 5 | - | 3 | 4 | 9 | 5 | 2 |
| | HEA | 1 | - | - | 1 | - | - | 2 | - | 1 | - | 1 |
| | 4HBA | - | 2 | - | - | - | - | - | 2 | - | 1 | - |
| | AA | - | - | 1 | - | 1 | 0.8 | - | 0.7 | 0.8 | 0.7 | 0.8 |
| Ionic compound (%) | Compound 1 | 0.01 | - | - | - | 0.05 | 0.1 | 0.8 | 1.2 | - | - | - |
| | Compound 2 | - | 0.1 | - | - | - | - | - | - | 1 | - | - |
| | Compound 3 | - | - | 1.8 | - | - | - | - | - | - | 1 | - |
| | Compound 4 | - | - | - | 0.5 | - | - | - | - | - | - | 1 |
| Sum (%) | | 100 | 100 | 100 | 100 | 100 | 100 | 100 | 100 | 100 | 100 | 100 |

BA: butyl acrylate
2EHA: 2-ethylhexylacrylate
HEA: 2-hydroxyethylacrylate
4HBA: 4-hydroxybutylacrylate
AA: acrylic acid
Compound 1: 1-ethylpyridinium bromide (made by Tokyo Casei Industries Ltd., m.p. 120°C)
Compound 2: tetra-n-butylammonium hexafluorophosphate (made by Tokyo Casei Industries Ltd., m.p. 246°C)
Compound 3: n-hexadecyltrimethylammonium hexafluorophosphate (made of Tokyo Casei Industries Ltd., m.p. 185°C)
Compound 4: cyclohexyltrimethylammonium bis(trifluoromethanesulfonyl)imide (made by Tokyo Casei Industries Ltd., m.p. above 50°C)

FIG. 1B

TABLE 1B

| | EXAMPLE | | | | | | | | | | |
|---|---|---|---|---|---|---|---|---|---|---|---|
| | 1 | 2 | 3 | 4 | 5 | 6 | 7 | 8 | 9 | 10 | 11 |
| Viscosity (mPa·s) | 4000 | 5000 | 3500 | 3500 | 4000 | 5000 | 4000 | 4000 | 3500 | 4000 | 4000 |
| Concentration (%) | 20 | 20 | 20 | 20 | 20 | 20 | 20 | 20 | 20 | 20 | 20 |
| Tg of base polymer (°C) | -52 | -53 | -53 | -52 | -52 | -51 | -52 | -53 | -53 | -53 | -51 |
| Weight average molecular weight of base polymer | 1,600,000 | 1,800,000 | 1,300,000 | 1,400,000 | 1,400,000 | 1,700,000 | 1,600,000 | 1,500,000 | 1,300,000 | 1,500,000 | 1,500,000 |

FIG. 2

TABLE 2

| Constitutional ratio of adhesive composition | | COMPARATIVE EXAMPLE | | | | | | |
|---|---|---|---|---|---|---|---|---|
| | | 1 | 2 | 3 | 4 | 5 | 6 | 7 |
| Base polymer (%) | BA | 99 | 98 | 95 | 90 | 97 | 97 | 95.2 |
| | 2EHA | - | - | - | 7 | - | - | - |
| | HEA | 1 | - | - | 1 | - | - | 3.8 |
| | 4HBA | - | - | 2 | - | - | 1 | - |
| | AA | - | 2 | - | - | 1 | - | - |
| Ionic compound (%) | Compound 5 | - | - | 3 | - | - | - | - |
| | Compound 6 | - | - | - | 2 | - | - | - |
| | Compound 7 | - | - | - | - | 2 | - | - |
| | Compound 8 | - | - | - | - | - | 2 | - |
| | Compound 9 | - | - | - | - | - | - | 1 |
| Sum (%) | | 100 | 100 | 100 | 100 | 100 | 100 | 100 |
| Viscosity (mPa·s) | | 5000 | 4500 | 5000 | 4500 | 4500 | 4500 | 4500 |
| Concentration (%) | | 20 | 20 | 20 | 20 | 20 | 20 | 20 |
| Tg of base polymer (°C) | | -52 | -50 | -53 | -53 | -52 | -52 | -51 |
| Weight average molecular weight of base polymer | | 1,800,000 | 1,600,000 | 1,800,000 | 1,500,000 | 1,700,000 | 1,700,000 | 1,700,000 |

BA: butyl acrylate
2EHA: 2-ethylhexylacrylate
HEA: 2-hydroxylethylacrylate
4HBA: 4-hydroxybutylacrylate
AA: acrylic acid
Compound 5: alkylbis(2-hydroxyethyl)methylammonium chloride (made by Lion, trade name ESOCARD C/12, m.p. less than 25°C)
Compound 6: lithium perchlorate, m.p. less than 25°C
Compound 7: 1-butyl-3-methylimidazolium tetrafluoroborate (made of Nihon Cosei Kagaku, m.p. less than 25°C)
Compound 8: 1-octyl-3-methylimidazolium hexafluorophosphate (made by Canto Chemical Co., Inc., m.p. less than 25°C)
Compound 9: 1-butyl-3-methylpyrinium trifluoromethane sulfonate (made by Tokyo Casei Industries, Ltd., m.p. less than 25°C)

FIG. 3

TABLE 3

| | EXAMPLE | | | | | | | | | | |
|---|---|---|---|---|---|---|---|---|---|---|---|
| | 1 | 2 | 3 | 4 | 5 | 6 | 7 | 8 | 9 | 10 | 11 |
| A. adhesive composition (wt. parts) | 100 | 100 | 100 | 100 | 100 | 100 | 100 | 100 | 100 | 100 | 100 |
| B. cross-linking agent (wt. parts) | 0.1 | 0.05 | 1 | 0.1 | 1 | 1.2 | 0.05 | 0.05 | 1.2 | 1.3 | 1.2 |
| C. silane coupling agent (wt. parts) | 0.1 | 0.1 | 0.1 | 0.1 | 0.1 | 0.1 | 0.1 | 0.1 | 0.1 | 0.1 | 0.1 |
| Viscosity of adhesive composition (mPa·s) | 3500 | 4500 | 3000 | 3000 | 3500 | 4500 | 3500 | 3500 | 3000 | 3500 | 3500 |
| Concentration of adhesive composition (%) | 18 | 18 | 18 | 18 | 18 | 18 | 18 | 18 | 18 | 18 | 18 |
| Gel fraction rate of adhesive composition | 70 | 67 | 75 | 65 | 70 | 75 | 68 | 68 | 73 | 73 | 73 |
| Performance test | Surface resistance (Ω/□) | $10^{13}$ | $10^{11}$ | $10^{9}$ | $10^{10}$ | $10^{12}$ | $10^{11}$ | $10^{10}$ | $10^{10}$ | $10^{10}$ | $10^{10}$ | $10^{10}$ |
| | Metal corrosion | ○ | ○ | ○ | ○ | ○ | ○ | ○ | ○ | ○ | ○ | ○ |
| | Light leakage | ○ | ○ | ○ | ○ | ○ | ○ | ○ | ○ | ○ | ○ | ○ |
| | Durability | ○ | ○ | ○ | ○ | ○ | ○ | ○ | ○ | ○ | ○ | ○ |
| | Adhesiveness (N/25mm) | 4 | 5 | 8 | 6 | 6 | 7 | 5 | 4 | 6 | 7 | 4 |
| | Substrate adhesion | ○ | ○ | ○ | ○ | ○ | ○ | ○ | ○ | ○ | ○ | ○ |
| | Substrate contamination | ○ | ○ | ○ | ○ | ○ | ○ | ○ | ○ | ○ | ○ | ○ |
| | Low temperature stability | ○ | ○ | ○ | ○ | ○ | ○ | ○ | ○ | ○ | ○ | ○ |
| | rework | ○ | ○ | ○ | ○ | ○ | ○ | ○ | ○ | ○ | ○ | ○ |

A: adhesive composition shown in Table 1
B: trimethylolpropane/tolylene diisocyanate (Nippon Polyurethane Industry Co., Ltd., trade name: CORONATE L)
C: 3-glycidoxypropylmethyl diethoxysilane (Shin-Etsu Chemical Co., Ltd., trade name: Shin-Etsu Silicone KBM-403)

FIG. 4

TABLE 4

| | | COMPARATIVE EXAMPLE | | | | | | |
|---|---|---|---|---|---|---|---|---|
| | | 1 | 2 | 3 | 4 | 5 | 6 | 7 |
| A. adhesive composition (wt. parts) | | 100 | 100 | 100 | 100 | 100 | 100 | 100 |
| B. cross-linking agent (wt. parts) | | 0.1 | 0.8 | 0.05 | 0.1 | 0.1 | 0.1 | 0.05 |
| C. silane coupling agent (wt. parts) | | 0.1 | 0.1 | 0.1 | 0.1 | 0.1 | 0.1 | 0.1 |
| Viscosity of adhesive composition (mPa·s) | | 4500 | 4000 | 4500 | 3500 | 4000 | 4500 | 5000 |
| Concentration of adhesive composition (%) | | 18 | 18 | 18 | 18 | 18 | 18 | 18 |
| Gel fraction rate of adhesive composition | | 70 | 65 | 67 | 72 | 75 | 72 | 68 |
| Performance test | Surface resistance (Ω/□) | $10^{15}$ | $10^{15}$ | $10^{10}$ | $10^{10}$ | $10^{9}$ | $10^{9}$ | $10^{10}$ |
| | Metal corrosion | o | o | x | x | o | o | o |
| | Light leakage | o | o | o | o | o | o | o |
| | Durability | o | o | o | o | o | o | o |
| | Adhesiveness (N/25mm) | 6 | 8 | 6 | 5 | 6 | 4 | 4 |
| | Substrate adhesion | o | o | x | o | o | o | o |
| | Substrate contamination | o | o | x | x | x | x | x |
| | Low temperature stability | o | o | o | o | o | o | o |
| | rework | o | o | o | o | o | o | o |

A: adhesive composition shown in Table 2
B: trimethylolpropane/tolylene diisocyanate (Nippon Polyurethane Industry Co., Ltd., trade name: CORONATE L)
C: 3-glycidoxypropylmethyl diethoxysilane (Shin-Etsu Chemical Co., Ltd., trade name: Shin-Etsu Silicone KBM-403)

ADHESIVE COMPOSITION AND OPTICAL MEMBER

BACKGROUND OF THE INVENTION

1. Field of the Invention

Embodiments relate to an adhesive composition and an optical member fabricated using the same.

2. Description of the Related Art

A surface of a display, e.g., a display for displaying images, text, etc., may be susceptible to the build-up and discharge of static electricity (electrostatic discharge). If surface discharge occurs, the display may attract dust. Static charges and/or discharge may also affect semiconductor components of the display or cause a display failure.

An antistatic agent may be added to an adhesive layer of an optical film, or an additional antistatic layer may be laminated on a display panel, e.g., a liquid crystal display panel, a plasma display panel, etc., of the display, in an effort to manage static electricity. However, such approaches may result in an optical member having reduced low temperature stability and/or exhibiting leakage of an ionic liquid contained in the adhesive layer, which may cause deterioration of optical members or metal elements.

SUMMARY OF THE INVENTION

Embodiments are therefore directed to an adhesive composition and an optical member fabricated using the same, which substantially overcome one or more of the problems due to the limitations and disadvantages of the related art.

It is therefore a feature of an embodiment to provide an adhesive composition having an antistatic agent and a base polymer.

It is therefore another feature of an embodiment to provide an optical member having an adhesive composition on at least one side thereof.

At least one of the above and other features and advantages may be realized by providing an adhesive composition, including an antistatic agent that includes an ionic compound having a melting point of 50° C. or more, and a base polymer having a glass transition temperature of 0° C. or less.

The antistatic agent may include a plurality of ionic compounds each having a melting point of 50° C. or more. The ionic compound may include at least one of an imidazolium salt, a pyridinium salt, an alkylammonium salt, an alkylpyrrolidinium salt, and an alkylphosphonium salt.

The ionic compound may include the imidizolium salt, and the imidizolium salt may have a melting point of 50° C. or more. The ionic compound may include the imidizolium salt, and the imidizolium salt may include at least one of 1,3-dimethylimidazolium chloride, 1-butyl-2,3-dimethylimidazolium chloride, 1-butyl-3-methylimidazolium bromide, 1-butyl-3-methylimidazolium chloride, 1-butyl-3-methylimidazolium methanesulfonate, 1-butyl-1-(3,3,4,4,5,5,6,6,7,7,8,8,8-tridecafluorooctyl)-imidazolium hexafluorophosphate, 1-ethyl-3-methylimidazolium bromide, 1-ethyl-3-methylimidazolium chloride, 1-ethyl-3-methylimidazolium hexafluorophosphate, 1-ethyl-3-methylimidazolium iodide, 1-ethyl-2,3-dimethylimidazolium chloride, 1-methylimidazolium chloride, 1,2,3-trimethylimidazolium methylsulfate, 1-methyl-3-(3,3,4,5,5,6,6,7,7,8,8,8-tridecafluorooctyl)-imidazolium hexafluorophosphate, 1-aryl-3-methylimidazolium chloride, 1-benzyl-3-methylimidazolium chloride, 1-benzyl-3-methylimidazolium hexafluorophosphate, or 1-benzyl-3-methylimidazolium tetrafluoroborate.

The ionic compound may include the pyridinium salt, and the pyridinium salt may have a melting point of 50° C. or more. The ionic compound may include the pyridinium salt, and the pyridinium salt may include at least one of 1-butyl-3-methylpyridinium bromide, 1-butyl-4-methylpyridinium bromide, 1-butyl-4-methylpyridinium chloride, 1-butylpyridinium bromide, 1-butylpyridinium chloride, 1-butylpyridinium hexafluorophosphate, 1-ethylpyridinium bromide, or 1-ethylpyridinium chloride.

The ionic compound may include the alkylammonium salt, and the alkylammonium salt may have a melting point of 50° C. or more.

The ionic compound may include the alkylammonium salt, and the alkylammonium salt may include at least one of cyclohexyltrimethylammonium bis(trifluoromethanesulfonyl)imide, tetra-n-butylammonium chloride, tetrabutylammonium bromide, tributylmethylammonium methylsulfate, tetrabutylammonium bis(trifluoromethylsulfonyl)imide, tetraethylammonium trifluoromethanesulfonate, tetrabutylammonium benzoate, tetrabutylammonium methanesulfate, tetrabutylammonium nonafluorobutanesulfonate, tetra-n-butylammonium hexafluorophosphate, tetrabutylammonium trifluoroacetate, tetrahexylammonium tetrafluoroborate, tetrahexylammonium bromide, tetrahexylammonium iodide, tetraoctylammonium chloride, tetraoctylammonium bromide, tetraheptylammonium bromide, tetrapentylammonium bromide, or n-hexadecyltrimethylammonium hexafluorophosphate.

The ionic compound may include the alkylpyrrolidinium salt, and the alkylpyrrolidinium salt has a melting point of 50° C. or more. The ionic compound may include the alkylpyrrolidinium salt, and the alkylpyrrolidinium salt may include at least one of 1-butyl-1-methylpyrrolidium bromide, 1-butyl-1-methylpyrrolidinium chloride, or 1-butyl-1-methylpyrrolidinium tetrafluoroborate.

The ionic compound may include the alkylphosphonium salt, and the alkylphosphonium salt has a melting point of 50° C. or more. The ionic compound may include the alkylphosphonium salt, and the alkylphosphonium salt may include at least one of tetrabutylphosphonium bromide, tetrabutylphosphonium chloride, tetrabutylphosphonium tetrafluoroborate, tetrabutylphosphonium methanesulfonate, tetrabutylphosphonium p-toluenesulfonate, or tributylhexadecylphosphonium bromide.

The base polymer may be an acryl polymer including (meth)acrylate having 1 to 14 carbon atoms in an alkyl group as a major component. The base polymer may have a weight average molecular weight of about 1,000,000 to about 2,000,000. The base polymer may be cross-linked with a cross-linking agent, and about 0.01 to about 5 wt. parts of the cross-linking agent may be used per 100 wt. parts of the base polymer. The base polymer may be cross-linked with a cross-linking agent, and the degree of cross-linking may be about 50 to about 80% in terms of gel fraction rate. The antistatic agent may be added in an amount of about 0.01 to about 1.8 wt. % relative to a combined weight of the base polymer and the antistatic agent.

At least one of the above and other features and advantages may also be realized by providing an optical member, including an optical sheet, and an adhesive composition on at least one side of the optical sheet. The adhesive composition may include an antistatic agent that includes an ionic compound having a melting point of 50° C. or more, and a base polymer having a glass transition temperature of 0° C. or less.

At least one of the above and other features and advantages may also be realized by providing a method of fabricating an optical member, including providing an adhesive composition, and applying the adhesive composition to at least one side of an optical sheet. The adhesive composition may include an antistatic agent that includes an ionic compound having a melting point of 50° C. or more, and a base polymer having a glass transition temperature of 0° C. or less.

At least one of the above and other features and advantages may also be realized by providing an adhesive composition, including an antistatic agent that includes an ionic compound, and a base polymer having a glass transition temperature of 0° C. or less. The ionic compound may include at least one of 1,3-dimethylimidazolium chloride, 1-butyl-2,3-dimethylimidazolium chloride, 1-butyl-3-methylimidazolium bromide, 1-butyl-3-methylimidazolium chloride, 1-butyl-3-methylimidazolium methanesulfonate, 1-butyl-1-(3,3,4,4,5,5,6,6,7,7,8,8-tridecafluorooctyl)-imidazolium hexafluorophosphate, 1-ethyl-3-methylimidazolium bromide, 1-ethyl-3-methylimidazolium chloride, 1-ethyl-3-methylimidazolium hexafluorophosphate, 1-ethyl-3-methylimidazolium iodide, 1-ethyl-2,3-dimethylimidazolium chloride, 1-methylimidazolium chloride, 1,2,3-trimethylimidazolium methylsulfate, 1-methyl-3-(3,3,4,5,5,6,6,7,7,8,8,8-tridecafluorooctyl)-imidazolium hexafluorophosphate, 1-aryl-3-methylimidazolium chloride, 1-benzyl-3-methylimidazolium chloride, 1-benzyl-3-methylimidazolium hexafluorophosphate, 1-benzyl-3-methylimidazolium tetrafluoroborate, 1-butyl-3-methylpyridinium bromide, 1-butyl-4-methylpyridinium bromide, 1-butyl-4-methylpyridinium chloride, 1-butylpyridinium bromide, 1-butylpyridinium chloride, 1-butylpyridinium hexafluorophosphate, 1-ethylpyridinium bromide, 1-ethylpyridinium chloride, cyclohexyltrimethylammonium bis(trifluoromethanesulfonyl)imide, tetra-n-butylammonium chloride, tetrabutylammonium bromide, tributylmethylammonium methylsulfate, tetrabutylammonium bis(trifluoromethylsulfonyl)imide, tetraethylammonium trifluoromethanesulfonate, tetrabutylammonium benzoate, tetrabutylammonium methanesulfate, tetrabutylammonium nonafluorobutanesulfonate, tetra-n-butylammonium hexafluorophosphate, tetrabutylammonium trifluoroacetate, tetrahexylammonium tetrafluoroborate, tetrahexylammonium bromide, tetrahexylammonium iodide, tetraoctylammonium chloride, tetraoctylammonium bromide, tetraheptylammonium bromide, tetrapentylammonium bromide, n-hexadecyltrimethylammonium hexafluorophosphate 1-butyl-1-methylpyrrolidium bromide, 1-butyl-1-methylpyrrolidinium chloride, 1-butyl-1-methylpyrrolidinium tetrafluoroborate, tetrabutylphosphonium bromide, tetrabutylphosphonium chloride, tetrabutylphosphonium tetrafluoroborate, tetrabutylphosphonium methanesulfonate, tetrabutylphosphonium p-toluenesulfonate, or tributylhexadecylphosphonium bromide.

At least one of the above and other features and advantages may also be realized by providing a method of fabricating a display, including providing a display panel, and attaching an optical member to the display panel, the optical member including an optical sheet and an adhesive composition on at least one side of the optical sheet. The adhesive composition may include an antistatic agent that includes an ionic compound having a melting point of 50° C. or more, and a base polymer having a glass transition temperature of 0° C. or less.

BRIEF DESCRIPTION OF THE DRAWINGS

The above and other features and advantages will become more apparent to those of ordinary skill in the art by describing in detail exemplary embodiments with reference to the attached drawings, in which:

FIGS. 1A and 1B illustrate Tables 1A and 1B, respectively;
FIG. 2 illustrates Table 2;
FIG. 3 illustrates Table 3; and
FIG. 4 illustrates Table 4.

DETAILED DESCRIPTION OF THE INVENTION

Japanese Patent Application No. 2007-184400, filed on Jul. 13, 2007, in the Japanese Intellectual Property Office, and entitled: "Adhesive Composition and Optical Member," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B and, C together, whereas the expression "either A, B, or C" means one of A alone, B alone, and C alone, and does not mean any of both A and B together; both A and C together; both B and C together; and all three of A, B and C together.

As used herein, molecular weights of polymeric materials are weight average molecular weights, unless otherwise indicated.

An embodiment relates to an adhesive composition. The adhesive composition may be used to fabricate an optical member, e.g., by applying the adhesive composition to one or both sides of an optical sheet. The optical member may be used as an optical member of a display, and may exhibit excellent antistatic properties, favorable adhesiveness, no metal corrosion, superior substrate adhesion leading to a decrease in substrate contamination, and improved low temperature stability.

In an embodiment, the adhesive composition may include an antistatic agent and a base polymer. The antistatic agent may include an ionic compound having a melting point of 50° C. or more. The base polymer may have a glass transition temperature (hereinafter, "Tg") of 0° C. or less. Details of the adhesive composition will now be described.

Adhesive Composition

An adhesive composition according to an embodiment may include an antistatic agent substantially including an ionic compound with a melting point of 50° C. or more, as well as a base polymer having a Tg of 0° C. or less. The base polymer contained in the composition is preferably cross-linked using a cross-linking agent.

As a result of adding the antistatic agent to the base polymer, when the adhesive composition is applied to a substrate such as an optical sheet to form an adhesive layer, the adhesive layer may exhibit a surface resistance ranging from, e.g., about $1\times10^8$ to about $1\times10^{13}\Omega/\square$ ("ohms per square"). Preferably, the surface resistance is about $1\times10^8$ to about $1\times10^{11}\Omega/\square$.

Antistatic Agent

An antistatic agent used in the adhesive composition according to an embodiment may include an ionic compound having a melting point of 50° C. or more. The ionic compound may have a melting point of more than 50° C., more preferably more than 80° C. and, most preferably, more than 100° C.

The melting point can be determined in consideration of melting points of different materials listed as follows and, especially, an upper limit of the melting point is about 250° C.

An adhesive composition including an ionic compound with a melting point of 50° C. or more is applicable, for example, to an adhesive layer for an optical member used in a flat panel display such as a TV, a computer terminal, etc. An adhesive composition containing an ionic compound with a melting point of more than 80° C. is preferably used to form an adhesive layer for an optical member used in, for example, a flat panel display mountable in an automobile.

The ionic compound used in the present invention is compatible with an organic solvent for dissolving the adhesive composition as well as the base polymer. The ionic compound is preferably a compound, or compounds, that can maintain transparency of the adhesive composition when the compound is added to the base polymer. Further, the ionic compound may be a compound, or compounds, that allows an adhesive layer, formed from an adhesive composition according to an embodiment, to have a specified surface resistance of up to $1\times10^{13}\Omega/\square$ when the adhesive composition is applied to a substrate such as an optical sheet.

The ionic compound may include at least one of an imidazolium salt, a pyridinium salt, an alkylammonium salt, an alkylpyrrolidinium salt, and an alkylphosphonium salt. The ionic compound may be a single compound or multiple compounds used in combination.

Examples of imidazolium salts include, e.g., 1,3-dimethylimidazolium chloride (m.p. 125° C.), 1-butyl-2,3-dimethylimidazolium chloride (m.p. 99° C.), 1-butyl-3-methylimidazolium bromide (m.p. 78° C.), 1-butyl-3-methylimidazolium chloride (m.p. 65° C.), 1-butyl-3-methylimidazolium methanesulfonate (m.p. 75 to 80° C.), 1-butyl-1-(3,3,4,4,5,5,6,6,7,7,8,8,8-tridecafluorooctyl)-imidazolium hexafluorophosphate (m.p. 120 to 121° C.), 1-ethyl-3-methylimidazolium bromide (m.p. 74° C.), 1-ethyl-3-methylimidazolium chloride (m.p. 80 to 84° C.), 1-ethyl-3-methylimidazolium hexafluorophosphate (m.p. 61° C.), 1-ethyl-3-methylimidazolium iodide (m.p. 79° C.), 1-ethyl-2,3-dimethylimidazolium chloride (m.p. 181° C.), 1-methylimidazolium chloride (m.p. 75° C.), 1,2,3-trimethylimidazolium methylsulfate (m.p. 113° C.), 1-methyl-3-(3,3,4,5,5,6,6,7,7,8,8,8-tridecafluorooctyl)-imidazolium hexafluorophosphate (m.p. 80° C.), 1-aryl-3-methylimidazolium chloride (m.p. 55° C.), 1-benzyl-3-methylimidazolium chloride (m.p. 70° C.), 1-benzyl-3-methylimidazolium hexafluorophosphate (m.p. 136° C.), 1-benzyl-3-methylimidazolium tetrafluoroborate (m.p. 77° C.), etc.

Examples of pyridinium salts include, e.g., 1-butyl-3-methylpyridinium bromide, 1-butyl-4-methylpyridinium bromide (m.p. 137° C.), 1-butyl-4-methylpyridinium chloride (m.p. 158° C.), 1-butylpyridinium bromide (m.p. 104° C.), 1-butylpyridinium chloride (m.p. 132° C.), 1-butylpyridinium hexafluorophosphate (m.p. 75° C.), 1-ethylpyridinium bromide (m.p. 120° C.), 1-ethylpyridinium chloride (m.p. 114° C.), etc.

Examples of alkylammonium salts include, e.g., cyclohexyltrimethylammonium bis(trifluoromethanesulfonyl)imide, tetra-n-butylammonium chloride (m.p. 75° C.), tetrabutylammonium bromide (m.p. 119), tributylmethylammonium methylsulfate (m.p. 62° C.), tetrabutylammonium bis(trifluoromethylsulfonyl)imide (m.p. 94 to 96° C.), tetraethylammonium trifluoromethanesulfonate (m.p. 161 to 163° C.), tetrabutylammonium benzoate (m.p. 64 to 67° C.), tetrabutylammonium methanesulfate (m.p. 78 to 80° C.), tetrabutylammonium nonafluorobutanesulfonate (m.p. 50 to 53° C.), tetra-n-butylammonium hexafluorophosphate (m.p. 246° C.), tetrabutylammonium trifluoroacetate (m.p. 74 to 76° C.), tetrahexylammonium tetrafluoroborate (m.p. 90 to 92° C.), tetrahexylammonium bromide (m.p. 97° C.), tetrahexylammonium iodide (m.p. 99° C.), tetraoctylammonium chloride (m.p. 50 to 54° C.), tetraoctylammonium bromide (m.p. 95 to 98° C.), tetraheptylammonium bromide (m.p. 89 to 91° C.), tetrapentylammonium bromide (m.p. 99° C.), n-hexadecyltrimethylammonium hexafluorophosphate (m.p. 185° C.), etc.

Examples of alkylpyrrolidinium salts include, e.g., 1-butyl-1-methylpyrrolidium bromide (m.p. 160° C. or more), 1-butyl-1-methylpyrrolidinium chloride (m.p. 114° C. or more), 1-butyl-1-methylpyrrolidinium tetrafluoroborate (m.p. 152° C.), etc.

Examples of alkylphosphonium salts include, e.g., tetrabutylphosphonium bromide (m.p. 104° C.), tetrabutylphosphonium chloride (m.p. 62 to 66° C.), tetrabutylphosphonium tetrafluoroborate (m.p. 96 to 99° C.), tetrabutylphosphonium methanesulfonate (m.p. 59 to 62° C.), tetrabutylphosphonium p-toluenesulfonate (m.p. 54 to 57° C.), tributylhexadecylphosphonium bromide (m.p. 57 to 62° C.), etc.

Base Polymer

A base polymer used in the adhesive composition according to an embodiment has a Tg of 0° C. or less, preferably ranging from about −100 to about −5° C. and, more preferably ranging from about −80 to about −10° C. Maintaining the Tg at or below 0° C. may help ensure that the base polymer containing an ionic compound exhibits sufficient adhesiveness.

The base polymer preferably includes at least one of commonly available polymers for adhesives, for example: an acrylic polymer including at least one of acrylate and/or methacrylate having 1 to 14 carbon atoms in an alkyl group, natural rubber, a styrene-isoprene-styrene block copolymer (SIS block copolymer), a styrene-butadiene-styrene block copolymer (SBS block copolymer), a styrene-ethylene-butadiene-styrene block copolymer (SEBS block copolymer), a styrene-butadiene rubber, polybutadiene, polyisoprene, polyisobutylene, butyl rubber, chloroprene rubber, silicone rubber, etc. Among these, it is preferable that the base polymer include, as a principal component, the acrylic polymer including at least one of acrylate and/or methacrylate having 1 to 14 carbon atoms in an alkyl group, in consideration of its excellent compatibility with the ionic compound, and its positive effects on the adhesiveness of the adhesive composition. The acrylic polymer may be used in an amount of about 50% by weight (hereinafter, "wt. %") to 100 wt. % of the base polymer.

Preferred examples of the acrylate and/or methacrylate (hereinafter, "(meth)acrylate") having 1 to 14 carbon atoms in an alkyl group include, e.g., methyl(meth)acrylate, ethyl(meth)acrylate, n-butyl(meth)acrylate, tert-butyl(meth)acrylate, 2-ethylhexyl(meth)acrylate, n-octyl(meth)acrylate, isooctyl(meth)acrylate, n-nonyl(meth)acrylate, isononyl (meth)acrylate, n-decyl(meth)acrylate, isodecyl(meth)acrylate, n-dodecyl(meth)acrylate, n-tridecyl(meth)acrylate, n-tetradecyl(meth)acrylate, etc. In a preferred implementation exhibiting high adhesiveness, the base polymer included in the adhesive composition contains n-butylacrylate as a principal component.

The base polymer preferably has a weight average molecular weight ranging from about 1,000,000 to about 2,000,000, which may help ensure that the adhesive composition has sufficient adhesiveness to form an adhesive layer of an optical member (or optical element). The weight average molecular weight can be estimated on a polystyrene conversion basis using gel-permeation chromatography.

The base polymer may further include additional components beyond those described above. The additional components may serve to regulate the Tg of the base polymer to 0° C. or less (in general, −100° C. or more). Such additional components may include, e.g., a component for enhancing cohesion and/or thermal resistance such as a sulfonic acid group containing monomer, a phosphate group containing monomer, a cyano group containing monomer, vinyl esters, an aromatic vinyl compound, etc. Such additional components may include a component having functional groups to enhance adhesiveness or to act as a starting point of a cross-linking reaction such as a monomer containing a carboxyl group, a monomer containing an acid anhydride group, a monomer containing a hydroxyl group, a monomer containing an amide group, a monomer containing an amino group, a monomer containing an epoxy group, n-acryloyl morpholine, vinylethers, etc. Such additional components may be used alone or in combination.

Examples of the monomer containing a sulfonic group include styrene sulfonic acid, aryl sulfonic acid, 2-(meth)acrylamido-2-methylpropane sulfonic acid, (meth)acrylamidopropane sulfonic acid, sulfopropyl(meth)acrylate, (meth)acryloyloxynaphthalene sulfonic acid, etc. An example of the monomer containing the phosphate group is 2-hydroxyethylacryloyl phosphate. An example of the monomer containing the cyano group is acrylonitrile. An example of the vinyl ester is vinyl acetate. An example of an aromatic vinyl compound is styrene.

Examples of the monomer containing the carboxyl group include (meth)acrylic acid, carboxyethyl(meth)acrylate, carboxypentyl(meth)acrylate, itaconic acid, maleic acid, fumaric acid, crotonic acid, 2-carboxyethylacrylate, etc. Examples of the monomer containing the acid anhydride group include maleic anhydride, itaconic anhydride, etc. Examples of the monomer containing the hydroxyl group include 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, n-methylol (meth)acrylamide, vinyl alcohol, aryl alcohol, 2-hydroxyethyl vinylether, 4-hydroxybutylvinylether, diethyleneglycol monovinylether, etc. Examples of the monomer containing the amide group include acrylamide, diethyl acrylamide, etc. Examples of the monomer containing the amino group include N,N-dimethylaminoethyl(meth)acrylate, N,N-dimethylaminopropyl(meth)acrylate, etc. Examples of the monomer containing the epoxy group include glycidyl(meth)acrylate, arylglycidylether, etc. An example of vinylether is vinylethylether.

The base polymer may be prepared by polymerization methods commonly used to synthesize polymers such as acrylic polymers, e.g., solution polymerization, emulsion polymerization, bulk polymerization, suspension polymerization, etc.

Cross-Linking Agent

The adhesive composition according to a preferred embodiment may provide an adhesive layer with improved thermal resistance by appropriately cross-linking the base polymer. The cross-linking method can be performed using a desired cross-linking agent. For example, the cross-linking method may include addition of a compound, as a proper starting point of a cross-linking reaction, which has functional groups capable of reacting with any one of carboxyl, hydroxyl, amino, amide, and the like, to an acryl polymer such as an isocyanate compound, an epoxy compound, an aziridine compound, metal chelates, etc.

Examples of the isocyanate compound include an aromatic isocyanate such as tolylene diisocyanate, xylene diisocyanate, etc.; an alicyclic isocyanate such as isophorone diisocyanate; and an aliphatic isocyanate such as hexamethylene diisocyanate. Among these, particularly preferable is an isocyanate compound and/or epoxy compound, which may provide a desirable level of cohesiveness. Such compounds may be used alone or in combination.

More particularly, preferred examples of the isocyanate compound include low aliphatic polyisocyanates such as butylene diisocyanate, hexamethylene diisocyanate, etc.; alicyclic isocyanates such as cyclopentylene diisocyanate, cyclohexylene diisocyanate, isophorone diisocyanate, etc.; aromatic diisocyanates such as 2,4-tolylene diisocyanate, 4,4'-diphenylmethane diisocyanate, xylene diisocyanate, etc.; and isocyanate adducts such as trimethylolpropane/tolylene diisocyanate trimer adduct (trade name: CORONATE L), trimethylolpropane/hexamethylene diisocyanate trimer adduct (trade name: CORONATE HL), isocyanurate (isocyanurate type) (trade name: CORONATE HX) (CORONATE is manufactured by Nippon Polyurethane Industrial Co., Ltd.).

The epoxy compound includes, for example, N,N,N'N'-tetraglycidyl-m-xylenediamine (trade name: TETRAD-X), 1,3-bis(N,N-diglycidylaminomethyl)cyclohexane (trade name: TETRAD-C), which are both manufactured by Mitsubishi Chemicals).

The cross-linking agent can be used alone or as a combination of two or more thereof. An amount of the cross-linking agent may be properly determined in consideration of a balance between the cross-linking agent and the base polymer to be cross-linked and, more preferably, use of an optical member. In order to obtain high thermal resistance of the base polymer by cohesiveness of an acrylic adhesive, in general, the cross-linking agent may be added to the base polymer in an amount of 0.01 wt. % or more, relative to 100 wt. % of the base polymer. The amount of the cross-linking agent is preferably 5 wt. % or less, with respect to 100 wt. % of the base polymer, in order to provide desirable levels of flexibility and/or adhesiveness.

The base polymer contained in the adhesive composition according to an embodiment has a cross-linking degree ranging from 50 to 80% in terms of gel fraction rate. If the gel fraction rate is within this range, the base polymer can improve adhesiveness of the adhesive composition. The gel fraction rate can be estimated by the following equation based on an initial weight and a weight after dipping and drying the adhesive composition, when dipped in ethyl acetate at 25° C. for a day:

Gel fraction rate=weight after dipping and drying/ initial weight×100.

Mixing Ratio

The weight ratio of the antistatic agent to the total weight of the base polymer and antistatic agent combined (antistatic agent/(antistatic agent+base polymer)) is preferably about 0.01 to about 1.8 wt. % and, more preferably, about 0.05 to about 1.5 wt. %. A ratio of less than about 0.01 wt. % may result in the adhesive composition exhibiting low antistatic effects. A ratio in excess of about 1.8 wt. % may result in contamination of an object to be coated by the adhesive composition.

Additional Components

The adhesive composition according to an embodiment may further include a variety of additives in different forms. Such additives may include powders, particles and/or foils, e.g., thickeners, surface lubricants, leveling agents, antioxidants, corrosion inhibitors, light stabilizers, UV absorbers, polymerization inhibitors, silane coupling agents, inorganic or organic fillers, metal powders, pigments, etc.

Preparation of Adhesive Composition

Preparation of an adhesive composition according to an embodiment may be exemplified by the following two methods.

The first example method may include admixing different types of monomers, as a raw material of the base polymer, together in an organic solvent having a boiling point of about 120° C. or less, e.g., ethyl acetate, toluene, acetone, hexanes, alcohols. Subsequently, a polymerization initiator may be added thereto to induce polymerization of the monomers and produce the base polymer. The resulting base polymer may be obtained in the state of a solution dissolved polymer and/or a polymer swollen in an organic solvent.

Next, the antistatic agent including the ionic compound may be added to the organic solvent containing the base polymer, and then homogeneously mixed with the base polymer.

Following this, the prepared mixture may be mixed with a cross-linking agent to cross-link the base polymer. In an implementation, this may be followed by addition of one or more additives, e.g., a silane coupling agent, etc. As a result, an adhesive composition according to an embodiment is prepared as a final product. The adhesive composition may be readily used to form an adhesive layer by applying the adhesive composition to a substrate and drying the coated substrate.

The second example method may include admixing different types of monomers, as a raw material of the base polymer, together in an organic solvent such as ethyl acetate and, at the same time, adding thereto the antistatic agent including the ionic compound. To the mixture may be further added a polymerization initiator to induce polymerization of the monomers, thus resulting in a base polymer containing the antistatic agent.

Following this, a cross-linking agent may be added to the resulting solution including the base polymer and the antistatic agent in the organic solvent so as to cross-link the base polymer. In an implementation, this may be followed by addition of one or more additives such as a silane coupling agent, etc. As a result, an adhesive composition of the present invention is prepared as a final product. Like the first method, the adhesive composition may be used to form an adhesive layer when applied to a substrate, followed by drying the coated substrate.

As described above with regard to preparation of the adhesive composition, the antistatic agent may be added to the base polymer after preparing the base polymer, or may be added to the base polymer during preparation thereof. In order to obtain a homogeneous mixture of the antistatic agent and the base polymer, the antistatic polymer is preferably soluble in an organic solvent such as ethyl acetate.

Optical Member

An optical member according to an embodiment includes an optical sheet and an adhesive layer formed using the adhesive composition according to an embodiment applied to one side or both sides of the optical sheet. The adhesive composition may be applied in a thickness ranging from about 3 to about 200 μm, preferably about 10 to about 100 μm. The adhesive layer may be coated on the optical sheet by directly applying the adhesive layer to the optical sheet. Alternatively, the adhesive layer may be first applied to another substrate (such as a thin liner) and then transferred to the optical sheet.

Application and coating of the adhesive layer may be performed by typical techniques employed in manufacturing adhesive tapes, e.g., roll coating, gravure coating, reverse coating, roll brush, spray coating, air-knife coating, die coating, etc.

The optical sheet may be, e.g., an optical sheet applicable to manufacture of a variety of displays and may include, e.g., a polarizer, a phase contrast plate, a brightness enhancement plate, an anti-glare sheet, etc. Furthermore, the optical sheet may also include a laminate of at least two optical layers such as a laminate of a polarizer and a phase contrast plate, a laminate formed using two or more phase contrast plates, a laminate of a polarizer and a brightness enhancement plate or an anti-glare sheet, etc.

The adhesive layer produced from the adhesive composition according to an embodiment and formed on the optical sheet may exhibit an adhesion strength ranging from about 1 to about 15 N/25 mm and, more preferably, about 5 to about 10 N/25 mm. The adhesion strength in the range of about 1 to about 15 N/25 mm may be desirable for an adhesive layer for an optical member. The adhesion strength may be measured and estimated according to JIS ZO237, which is a known test method for adhesive tapes and adhesive sheets. More particularly, after leaving an optical member with an adhesive layer at 23° C. under 50% RH atmosphere for 7 days, the optical member may be cut to a width of 25 mm. The cut sample may then be attached to a glass sheet for autoclave treatment at 50° C. and a pressure of 5 kg/cm$^2$ for 20 minutes. Subsequently, using a tensile tester, measurement of adhesiveness of the sample may be conducted with a stripping speed of 0.3 m/min at a stripping angle of 180° at 23° C. under 50% RH atmosphere according to JIS ZO237, so as to evaluate adhesiveness of the adhesive layer.

The adhesive composition according to an embodiment includes an antistatic agent including an ionic compound having a melting point of 50° C. or more, as well as the base polymer. Accordingly, the antistatic agent may exist substantially in a solid state in the composition at ordinary temperature of 20 to 25° C. Accordingly, the antistatic agent does not transform from a liquid state to a solid state at temperatures near room temperature, thereby preventing a decrease in transparency of the composition due to precipitation of the antistatic agent. In addition, leakage of liquefied antistatic agent, contamination, and/or corrosion of a member to be coated with the composition may be avoided.

When an ionic compound having a melting point of more than 80° C. is used as the antistatic agent, the antistatic agent may be stable in a solid state at a constant temperature of about 70° C. or less. Therefore, such an ionic compound is preferably used to form an adhesive layer for an optical member that may be used in a flat panel display such as a TV, a computer terminal, etc.

When an ionic compound having a melting point of more than 100° C. is used as the antistatic agent, the antistatic agent may be stable in a solid state at a constant temperature of about 95° C. or less. Therefore, such an ionic compound is preferably used to form an adhesive layer for an optical member used for a display panel that is frequently subjected to high temperatures, e.g., a flat panel display for automobiles.

The antistatic agent has a relatively high melting point of 50° C. or more, such that the antistatic agent can be maintained in a solid state. As a result, the adhesive composition of the present invention may exhibit better temperature stability than an adhesive composition containing an ionic solution which is in a liquid state at room temperature.

As described above, the adhesive composition according to an embodiment may prevent degradation or deterioration over a broad range of temperatures, e.g., −40 to 80° C., and may exhibit superior stability under elevated temperatures. Further, when the adhesive composition according to an embodiment is applied to a substrate, e.g., an optical sheet, to form an adhesive layer, the adhesive layer may exhibit desired sheet resistance of, e.g., about $1\times10^8$ to about $1\times10^{13} \Omega/\square$ and, more preferably, from about $1\times10^8$ to about $1\times10^{11} \Omega/\square$, thereby exhibiting excellent antistatic performance. Moreover, the adhesive composition according to an embodiment may contain a base polymer with a Tg of 0° C. or more and, thus, may express good adhesiveness.

The base polymer contained in the adhesive composition may include acrylates and/or methacrylates having 1 to 14 carbon atoms in an alkyl group as a principal component. Accordingly, the adhesive composition may exhibit improved transparency sufficient to form an adhesive layer of an optical member.

A weight average molecular weight of the base polymer may be about 1,000,000 to about 2,000,000, and a gel fraction rate of the same may range from about 50 to about 80%. Therefore, if using the adhesive composition as an adhesive layer of an optical member, the adhesive layer may exhibit improved adhesiveness.

If the adhesive composition containing a silane coupling agent is used to form an adhesive layer of an optical member, chemical bonds may be formed between the silane coupling agent and functional groups on the surface of a substrate to be coated. This results in an increase in adhesion strength at an interface between the adhesive layer and the substrate. Consequently, even if a thermal expansion coefficient of the substrate is considerably different from that of the optical member, stress is concentrated at the interface between the adhesive layer and the substrate due to a difference in thermal expansion coefficients, thereby alleviating stress applied to the optical member.

The following Examples and Comparative Examples are provided in order to set forth particular details of one or more embodiments. However, it will be understood that the embodiments are not limited to the particular details described.

EXAMPLES

Hereinafter, a method for preparation of adhesive compositions according to Examples 1 to 11 and Comparative Examples 1 to 7 will be described in detail. Furthermore, a process for fabrication of optical members according to Examples 1 to 11 and Comparative Examples 1 to 7 will be described, including application of the adhesive composition to a polarizer to form an optical member. Each of the fabricated optical members was subjected to performance testing.

Preparation of a Copolymer Composition According to Example 1

98.99 parts by weight ("wt. parts") of butylacrylate, 1 wt. parts of 2-hydroxyethylacrylate and 120 wt. parts of ethyl acetate as a solvent were placed in a flask equipped with a reflux condenser and an agitator and heated to 65° C. under a nitrogen atmosphere. As a polymerization initiator, 0.04 wt. parts of AIBN was added thereto and allowed to conduct polymerization over 6 hours while maintaining the same temperature of 65° C. After completing the polymerization, an ionic compound (1-ethylpyridinium bromide) was added to the reaction product in an amount of 0.01 wt. parts. In order to control viscosity of the product, 280 wt. parts of ethyl acetate was further added thereto. Then, cooling the product to room temperature resulted in a copolymer composition solution (referred to as "copolymer solution") containing an adhesive composition according to Example 1. A concentration of the adhesive composition in the copolymer solution was about 20 wt. % while a viscosity of the copolymer solution was 4000 mPa·s.

Tables 1A and 1B in FIGS. 1A and 1B, respectively, show a mixing ratio of ingredients in the adhesive composition, a concentration of the adhesive composition in the copolymer solution, and a viscosity of the copolymer solution. The Tg of the base polymer was determined by a procedure wherein ethyl acetate was first evaporated from the adhesive composition to isolate the adhesive composition from the copolymer solution, and the isolated adhesive composition was subjected to DSC (Differential Scanning Calorimetry) and Tg measurement for the base polymer contained in the adhesive composition. The results are shown in Table 1B.

Preparation of Copolymer Composition Solutions According to Examples 2 to 11

Each copolymer solution containing adhesive compositions according to Examples 2 to 11 was prepared by the same process described in Example 1, except the ionic compound was modified as follows: Examples 2 and 9 used tetra-n-butylammonium hexafluorophosphate instead of 1-ethylpyridinium bromide; Examples 3 and 10 used n-hexadecyltrimethylammonium hexafluorophosphate instead of 1-ethylpyridinium bromide; and Examples 4 and 11 used cyclohexyltrimethylammonium bis(trifluoromethanesulfonyl)imide instead of 1-ethylpyridinium bromide. Moreover, in addition to the modifications to the ionic compounds, the make-up of the base polymer was varied, as shown in detail in Table 1A, to use various amounts of butylacrylate in combination with one or more of 2-hydroxyethylacrylate, 2-ethylhexylacrylate, 4-hydroxybutylacrylate, or acrylic acid.

For each of the resulting copolymer solutions containing the adhesive compositions according to Examples 2 to 11, Tables 1A and 1B show a mixing ratio of ingredients in the adhesive composition, a concentration of the adhesive composition in the copolymer solution, a viscosity of the copolymer solution, and Tg of the base polymer in the adhesive composition.

Preparation of Copolymer Composition Solutions According to Comparative Examples 1 to 7

Copolymer solutions containing adhesive compositions according to Comparative Examples 1 to 7 were prepared by the same process described in Example 1, except that the make-up of the base polymer and the compound used as the ionic compound were varied. In the base polymer, butylacrylate was combined with one or more monomers selected from 2-hydroxyethylacrylate, 2-ethylhexylacrylate, 4-hydroxybutylacrylate, and acrylic acid. As the ionic compound, alkylbis(2-hydroxyethyl)methylammonium chloride, lithium perchlorate, 1-butyl-3-methylimidazolium tetrafluoroborate, 1-octyl-3-methylimidazolium hexafluorophosphate, and 1-butyl-3-methylpyridinium trifluoromethanesulfonate were used.

For each of the resulting copolymer solutions containing the adhesive compositions according to Comparative Examples 1 to 7, Table 2 in FIG. 2 shows a mixing ratio of ingredients in the adhesive composition, a concentration of the adhesive composition in the copolymer solution, a viscosity of the copolymer solution, and a Tg of the base polymer in the adhesive composition.

Fabrication of Optical Members According to Examples 1 to 11 and Comparative Examples 1 to 7

To 100 wt. % of each copolymer solution containing adhesive compositions according to Examples 1 to 11 and Comparative Examples 1 to 7, as shown in Tables 1 and 2, respectively, a trimethylolpropane/tolylene diisocyanate type crosslinking agent B (Nippon Polyurethane Ind. Co., Ltd., trade name: CORONATE L) and 3-glycidoxypropylmethyl diethoxysilane as a silane coupling agent C (Shin-Etsu Chemical Co., Ltd., trade name: Shin-Etsu Silicone KBM-403) were added to achieve a mixing ratio listed in Table 3 (FIG. 3) or Table 4 (FIG. 4). Subsequently, the components were homogeneously mixed to prepare an adhesive composition in a solution state.

The adhesive composition was applied to a thin PET film (manufactured by Mitsubishi Chemical Polyester Film Corp., trade name: MRF 38) to form an adhesive layer with a dry thickness of 25 μm, the samples being dried at 90° C. for 3 minutes to form an adhesive layer from the adhesive composition. The thin PET film having the adhesive layer was attached to a polarizer (manufactured by Miguan Imaging, trade name: MLPH) to produce an optical member according to each of Examples 1 to 11 and Comparative Examples 1 to 7.

The fabricated optical member was subjected to performance testing to determine and analyze a variety of properties including adhesiveness, surface resistance, metal corrosion, light leakage, durability, substrate adhesion, contamination of a substrate to be coated, and temperature stability. Furthermore, other features were also measured and/or determined, including a concentration of the adhesive composition in the solution, a viscosity of the adhesive composition, and a gel fraction rate of the adhesive composition after cross-linking. The gel fraction rate was estimated by the equation [Gel fraction rate=weight after dipping and drying/initial weight× 100] on the basis of an initial weight and a weight after dipping and drying the adhesive composition, when dipped in ethyl acetate at 25° C. for a day.

Performance Test Procedures

Performance tests were performed according to the following procedures, the results of which are set forth in Tables 3 and 4 in FIGS. 3 and 4, respectively.

Surface Resistance

After leaving the respective optical member with an adhesive layer at 23° C. under 50% RH atmosphere for 7 days, surface resistance of the optical member was measured using a micro-electrometer (Kawaguchi Electric Works Co., Ltd.) at 23° C. under 50% RH atmosphere.

Metal Corrosion

After leaving the optical member with an adhesive layer at 23° C. under 50% RH atmosphere for 7 days, an aluminum foil was attached to a surface of the adhesive layer and left at 60° C. under 90% RH atmosphere for 2 days, followed by observing the condition of the adhesive layer. A case showing no change in the aluminum foil is denoted by an "o" while a case showing whitening of the aluminum foil is denoted by an "x".

Light Leakage

After leaving the optical member with an adhesive layer at 23° C. under 50% RH atmosphere for 7 days, the optical member was cut to dimensions of 120 mm (MD direction of a polarizer)×60 mm, and 120 mm (TD direction of a polarizer)×60 mm, respectively. The cut plates were attached to both sides of a glass substrate and then subjected to autoclave treatment at 50° C. and a pressure of 5 kg/cm² for 20 minutes. After leaving the treated glass substrate at 80° C. for 120 hours, appearance of the glass substrate was observed. A case showing no light leakage is denoted by an "o" while a case showing light leakage is denoted by an "x".

Durability

After leaving the optical member with an adhesive layer at 23° C. under 50% RH atmosphere for 7 days, the optical member was cut to dimensions of 120 mm (MD direction of a polarizer)×60 mm. The cut plate was attached to one side of a glass substrate and then subjected to autoclave treatment at 50° C. and a pressure of 5 kg/cm² for 20 minutes. After leaving the treated glass substrate at 80° C., then, at 60° C. under 90% RH atmosphere for 120 hours, appearance of the glass substrate was observed. A case showing no foam, floatation, and/or separation of the cut plate is denoted by an "o" while a case showing foam, floatation, and/or separation of the cut plate is denoted by an "x".

Adhesiveness and Substrate Adhesion

After leaving the optical member with an adhesive layer at 23° C. under 50% RH atmosphere for 7 days, the optical member was cut to a width of 25 mm, attached to one side of a glass substrate, and then subjected to autoclave treatment at 50° C. and a pressure of 5 kg/cm² for 20 minutes. Adhesiveness of the treated glass substrate was measured using a tensile tester with a stripping speed of 0.3 m/min at a stripping angle of 180° at 23° C. under 50% RH atmosphere according to JIS ZO237, which is a test method for adhesive tapes and/or adhesive sheets. Substrate (polarizer) adhesion was also measured. A case when the adhesive layer was not completely removed from the polarizer is denoted by an "o" while a case where the adhesive layer was completely removed from the polarizer is denoted by an "x".

Contamination of Substrate

Before and after measuring the adhesiveness as described above, a contact angle of the glass substrate was determined. When there was no variation in the contact angles before and after the measurement of adhesiveness, the result is denoted by an "o" while, if the contact angles were altered before and after the measurement of adhesiveness, the result is denoted by an "x". Measurement of contact angles was performed according to JIS R3257, which is a test method for wettability of glass substrates.

Low Temperature Stability

After leaving the optical member with an adhesive layer at 23° C. under 50% RH atmosphere for 7 days, the optical member was cut to dimensions of 120 mm (MD direction of a polarizer)×60 mm. The cut plate was attached to one side of a glass substrate and then subjected to autoclave treatment at 50° C. and a pressure of 5 kg/cm² for 20 minutes. After leaving the treated substrate at −40° C. for 120 hours, appearance of the glass substrate was observed. A case showing no foam, floatation, and/or separation of the cut plate or no precipitation is denoted by an "o" while a case showing foam, floatation, and/or separation of the cut plate and/or precipitation is denoted by an "x".

Rework

During the measurement of adhesiveness as described above, stripping conditions were observed. A case where an interface failure between the adhesive layer and the substrate was observed is denoted by an "o" while a case where cohesive failure or DE (electro-deposition) was observed on the substrate is denoted by an "x".

Referring to Table 3, it was found that the optical member according to Example 1 had a desirable adhesiveness of 4N/25 mm after aging at room temperature for 7 days. Also, the adhesive layer of the optical member according to Example 1 had a surface resistance of $10^{13} \Omega/\square$, thus exhibiting superior antistatic properties. The optical member according to Example 1 also proved to be favorable in terms of metal corrosion, light leakage, durability, substrate adhesion, substrate contamination, low temperature stability, and rework.

Likewise, all of the optical members according to Examples 2 to 11 had excellent properties including adhesiveness, surface resistance of an adhesive layer, metal corrosion, light leakage, durability, substrate adhesion, substrate contamination, low temperature stability, and rework.

In contrast, referring to Table 4, each of the optical members according to Comparative Examples 1 and 2, from which an antistatic agent was omitted, showed a surface resistance of $10^{15} \Omega/\square$ and exhibited antistatic properties inferior to those of the optical members according to Examples 1 to 11. Likewise, each of the optical members according to Comparative Examples 3 to 7, which included an ionic compound having a melting point of not more than 25° C., showed elevated levels of substrate contamination compared to the optical members according to Examples 1 to 11. Moreover, the optical members according to Comparative Examples 5 to 7 had reduced low temperature stability.

From the results described above, it can be seen that the optical members of Examples 1 to 11 according to embodiments have excellent antistatic properties, favorable adhesiveness, no metal corrosion, superior substrate adhesion leading to a decrease in substrate contamination, and improved low temperature stability, as compared to the optical members according to Comparative Examples 1 to 7.

As described above, embodiments may provide an adhesive composition with excellent low temperature stability and without leakage of constitutional ingredients of an adhesive contained in the composition and, in addition, an optical member fabricated using the same.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An adhesive composition, comprising:
an antistatic agent that includes an alkylpyrrolidinium salt having a halide or borate anion and having a melting point of 50° C. or more; and
a base polymer having a glass transition temperature of 0° C. or less.

2. The adhesive composition as claimed in claim 1, wherein the antistatic agent further includes an ionic compound having a melting point of 50° C. or more.

3. The adhesive composition as claimed in claim 2, wherein the ionic compound includes at least one of an imidazolium salt, a pyridinium salt, an alkylammonium salt, and an alkylphosphonium salt.

4. The adhesive composition as claimed in claim 3, wherein:
the ionic compound includes the imidazolium salt, and
the imidazolium salt has a melting point of 50° C. or more.

5. The adhesive composition as claimed in claim 3, wherein:
the ionic compound includes the imidazolium salt, and
the imidazolium salt includes at least one of 1,3-dimethylimidazolium chloride, 1-butyl-2,3-dimethylimidazolium chloride, 1-butyl-3-methylimidazolium bromide, 1-butyl-3-methylimidazolium chloride, 1-butyl-3-methylimidazolium methanesulfonate, 1-butyl-1-(3,3,4,4,5,5,6,6,7,7,8,8-tridecafluorooctyl)-imidazolium hexafluorophosphate, 1-ethyl-3-methylimidazolium bromide, 1-ethyl-3-methylimidazolium chloride, 1-ethyl-3-methylimidazolium hexafluorophosphate, 1-ethyl-3-methylimidazolium iodide, 1-ethyl-2,3-dimethylimidazolium chloride, 1-methylimidazolium chloride, 1,2,3-trimethylimidazolium methylsulfate, 1-methyl-3-(3,3,4,5,5,6,6,7,7,8,8,8-tridecafluorooctyl)-imidazolium hexafluorophosphate, 1-aryl-3-methylimidazolium chloride, 1-benzyl-3-methylimidazolium chloride, 1-benzyl-3-methylimidazolium hexafluorophosphate, or 1-benzyl-3-methylimidazolium tetrafluoroborate.

6. The adhesive composition as claimed in claim 3, wherein:
the ionic compound includes the pyridinium salt, and
the pyridinium salt has a melting point of 50° C. or more.

7. The adhesive composition as claimed in claim 3, wherein:
the ionic compound includes the pyridinium salt, and
the pyridinium salt includes at least one of 1-butyl-3-methylpyridinium bromide, 1-butyl-4-methylpyridinium bromide, 1-butyl-4-methylpyridinium chloride, 1-butylpyridinium bromide, 1-butylpyridinium chloride, 1-butylpyridinium hexafluorophosphate, 1-ethylpyridinium bromide, or 1-ethylpyridinium chloride.

8. The adhesive composition as claimed in claim 3, wherein:
the ionic compound includes the alkylammonium salt, and
the alkylammonium salt has a melting point of 50° C. or more.

9. The adhesive composition as claimed in claim 3, wherein:
the ionic compound includes the alkylammonium salt, and
the alkylammonium salt includes at least one of cyclohexyltrimethylammonium bis(trifluoromethanesulfonyl)imide, tetra-n-butylammonium chloride, tetrabutylammonium bromide, tributylmethylammonium methylsulfate, tetrabutylammonium bis(trifluoromethylsulfonyl)imide, tetraethylammonium trifluoromethanesulfonate, tetrabutylammonium benzoate, tetrabutylammonium methanesulfate, tetrabutylammonium nonafluorobutanesulfonate, tetra-n-butylammonium hexafluorophosphate, tetrabutylammonium trifluoroacetate, tetrahexylammonium tetrafluoroborate, tetrahexylammonium bromide, tetrahexylammonium iodide, tetraoctylammonium chloride, tetraoctylammonium bromide, tetraheptylammonium bromide, tetrapentylammonium bromide, or n-hexadecyltrimethylammonium hexafluorophosphate.

10. The adhesive composition as claimed in claim 1, wherein:
the alkylpyrrolidinium salt includes at least one of 1-butyl-1-methylpyrrolidinium bromide, 1-butyl-1-methylpyrrolidinium chloride, or 1-butyl-1-methylpyrrolidinium tetrafluoroborate.

11. The adhesive composition as claimed in claim 3, wherein:
the ionic compound includes the alkylphosphonium salt, and
the alkylphosphonium salt has a melting point of 50° C. or more.

12. The adhesive composition as claimed in claim 3, wherein:
the ionic compound includes the alkylphosphonium salt, and
the alkylphosphonium salt includes at least one of tetrabutylphosphonium bromide, tetrabutylphosphonium chloride, tetrabutylphosphonium tetrafluoroborate, tetrabutylphosphonium methanesulfonate, tetrabutylphosphonium p-toluenesulfonate, or tributylhexadecylphosphonium bromide.

13. The adhesive composition as claimed in claim 1, wherein the base polymer is an acryl polymer including (meth)acrylate having 1 to 14 carbon atoms in an alkyl group as a major component.

14. The adhesive composition as claimed in claim 13, wherein the base polymer has a weight average molecular weight of about 1,000,000 to about 2,000,000.

15. The adhesive composition as claimed in claim 1, wherein:
the base polymer is cross-linked with a cross-linking agent, and
about 0.01 to about 5 wt. parts of the cross-linking agent is used per 100 wt. parts of the base polymer.

16. The adhesive composition as claimed in claim 1, wherein:
the base polymer is cross-linked with a cross-linking agent, and
the degree of cross-linking is about 50 to about 80% in terms of gel fraction rate.

17. The adhesive composition as claimed in claim 1, wherein the antistatic agent is added in an amount of about 0.01 to about 1.8 wt. % relative to a combined weight of the base polymer and the antistatic agent.

18. An optical member, comprising:
an optical sheet; and
an adhesive composition on at least one side of the optical sheet, wherein the adhesive composition is the adhesive composition as claimed in claim 1.

19. A method of fabricating an optical member, comprising:
providing an adhesive composition; and
applying the adhesive composition to at least one side of an optical sheet, wherein the adhesive composition is the adhesive composition as claimed in claim 1.

20. An adhesive composition, comprising:
an antistatic agent that includes an ionic compound; and
a base polymer having a glass transition temperature of 0° C. or less, wherein:
the ionic compound includes at least one of 1,3-dimethylimidazolium chloride, 1-butyl-2,3-dimethylimidazolium chloride, 1-butyl-3-methylimidazolium bromide, 1-butyl-3-methylimidazolium chloride, 1-butyl-3-methylimidazolium methanesulfonate, 1-butyl-1-(3,3,4,4,5,5,6,6,7,7,8,8,8-tridecafluorooctyl)-imidazolium hexafluorophosphate, 1-ethyl-3-methylimidazolium bromide, 1-ethyl-3-methylimidazolium chloride, 1-ethyl-3-methylimidazolium iodide, 1-ethyl-2,3-dimethylimidazolium chloride, 1-methylimidazolium chloride, 1,2,3-trimethylimidazolium methylsulfate, 1-methyl-3-(3,3,4,5,5,6,6,7,7,8,8,8-tridecafluorooctyl)-imidazolium hexafluorophosphate, 1-aryl-3-methylimidazolium chloride, 1-benzyl-3-methylimidazolium chloride, 1-benzyl-3-methylimidazolium hexafluorophosphate, 1-benzyl-3-methylimidazolium tetrafluoroborate, 1-butyl-3-methylpyridinium bromide, 1-butyl-4-methylpyridinium bromide, 1-butyl-4-methylpyridinium chloride, 1-butylpyridinium bromide, 1-butylpyridinium chloride, 1-butylpyridinium hexafluorophosphate, 1-ethylpyridinium bromide, 1-ethylpyridinium chloride, cyclohexyltrimethylammonium bis(trifluoromethanesulfonyl)imide, tributylmethylammonium methylsulfate, tetrabutylammonium methanesulfate, tetrabutylammonium nonafluorobutanesulfonate, tetrabutylammonium trifluoroacetate, tetraoctylammonium chloride, tetraoctylammonium bromide, tetraheptylammonium bromide, tetrapentylammonium bromide, n-hexadecyltrimethylammonium hexafluorophosphate 1-butyl-1-methylpyrrolidium bromide, 1-butyl-1-methylpyrrolidinium chloride, 1-butyl-1-methylpyrrolidinium tetrafluoroborate, tetrabutylphosphonium bromide, tetrabutylphosphonium chloride, tetrabutylphosphonium tetrafluoroborate, tetrabutylphosphonium methanesulfonate, tetrabutylphosphonium p-toluenesulfonate, or tributylhexadecylphosphonium bromide.

21. A method of fabricating a display, comprising:
providing a display panel; and
attaching an optical member to the display panel, the optical member including an optical sheet and an adhesive composition on at least one side of the optical sheet, wherein the adhesive composition is the adhesive composition as claimed in claim 1.

22. An optical member, comprising:
an optical sheet; and
an adhesive composition on at least one side of the optical sheet, wherein the adhesive composition is the adhesive composition as claimed in claim 20.

23. A method of fabricating an optical member, comprising:
providing an adhesive composition; and
applying the adhesive composition to at least one side of an optical sheet, wherein the adhesive composition is the adhesive composition as claimed in claim 20.

24. A method of fabricating a display, comprising:
providing a display panel; and
attaching an optical member to the display panel, the optical member including an optical sheet and an adhesive composition on at least one side of the optical sheet, wherein the adhesive composition is the adhesive composition as claimed in claim 20.

* * * * *